United States Patent
Ren

(10) Patent No.: US 10,755,064 B2
(45) Date of Patent: *Aug. 25, 2020

(54) CODE SCANNING SECURITY CHECK METHOD AND APPARATUS

(71) Applicant: ALIBABA GROUP HOLDING LIMITED, Grand Cayman (KY)

(72) Inventor: Jian Ren, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,838

(22) Filed: Dec. 17, 2019

(65) Prior Publication Data

US 2020/0125814 A1    Apr. 23, 2020

Related U.S. Application Data

(63) Continuation of application No. 16/124,001, filed on Sep. 6, 2018, now Pat. No. 10,599,900.

(30) Foreign Application Priority Data

Sep. 8, 2017   (CN) .......................... 2017 1 0807825

(51) Int. Cl.
*G06K 7/14* (2006.01)
*G06K 19/06* (2006.01)
*G06Q 10/00* (2012.01)

(52) U.S. Cl.
CPC ..... *G06K 7/1417* (2013.01); *G06K 19/06037* (2013.01); *G06Q 10/00* (2013.01)

(58) Field of Classification Search
None
See application file for complete search history.

(56) References Cited

U.S. PATENT DOCUMENTS

| 8,838,988 B2 | 9/2014 | Bravo et al. |
| 9,158,770 B1 | 10/2015 | Beadles |
| 9,965,770 B2 | 5/2018 | Mason-Gugenheim et al. |

(Continued)

FOREIGN PATENT DOCUMENTS

| CN | 101377874 A | 3/2009 |
| CN | 101377875 A | 3/2009 |

(Continued)

OTHER PUBLICATIONS

Written Opinion of the International Searching Authority and International Search Report for Application No. PCT/US2018/049784 dated Jan. 28, 2019 (10 pages).

(Continued)

*Primary Examiner* — Kristy A Haupt
(74) *Attorney, Agent, or Firm* — Sheppard Mullin Richter & Hampton LLP

(57) ABSTRACT

A transaction code identification method comprises scanning a transaction code, the transaction code comprising: a two-dimensional code and a check code; parsing the two-dimensional code to obtain a two-dimensional code content contained in the two-dimensional code; obtaining the check code; and sending the two-dimensional code content and the check code to a server to cause the server to verify the transaction code based on the two-dimensional code content and the check code.

20 Claims, 8 Drawing Sheets

(56) References Cited

U.S. PATENT DOCUMENTS

| | | |
|---|---|---|
| 10,037,561 B1 | 7/2018 | Hecht |
| 10,599,900 B2 * | 3/2020 | Ren .................. G06K 7/1417 |
| 2008/0257959 A1 | 10/2008 | Oved |
| 2010/0012736 A1 | 1/2010 | Wilds et al. |
| 2011/0047039 A1 | 2/2011 | Crames et al. |
| 2011/0184867 A1 | 7/2011 | Varadarajan |
| 2013/0086650 A1 | 4/2013 | Soundrapandian et al. |
| 2014/0067674 A1 | 3/2014 | Leyva et al. |
| 2014/0108606 A1 | 4/2014 | Beadles |
| 2014/0175179 A1 | 6/2014 | Carter |
| 2015/0178721 A1 | 6/2015 | Pandiarajan et al. |
| 2015/0248664 A1 | 9/2015 | Makhdumi et al. |
| 2015/0262031 A1 | 9/2015 | Wang et al. |
| 2015/0302215 A1 | 10/2015 | Hu |
| 2015/0334108 A1 | 11/2015 | Khalil et al. |
| 2015/0349848 A1 | 12/2015 | Yang et al. |
| 2016/0155112 A1 | 6/2016 | Phillips et al. |
| 2016/0267515 A1 | 9/2016 | Walz et al. |
| 2017/0039559 A1 | 2/2017 | Frieden |
| 2017/0046699 A1 | 2/2017 | Bravo et al. |
| 2017/0104711 A1 | 4/2017 | Hanson et al. |
| 2019/0080129 A1 | 3/2019 | Ren et al. |

FOREIGN PATENT DOCUMENTS

| | | |
|---|---|---|
| CN | 103825734 A | 5/2014 |
| CN | 106504344 A | 3/2017 |
| CN | 206097726 U | 4/2017 |
| TW | 201101779 A | 1/2011 |
| TW | 395449 B | 5/2013 |

OTHER PUBLICATIONS

Non-final rejection and Search Report for Taiwanese Application No. 107115872 dated Apr. 25, 2019 (12 pages).

Office Action and Search Report for Taiwanese Application No. 107115872 dated Sep. 20, 2019 (12 pages).

First Search for Chinese Application No. 201710807825.8 dated Jan. 13, 2020 (1 page).

First Office Action for Chinese Application No. 201710807825.8 dated Jan. 20, 2020 with English machine translation (27 pages).

* cited by examiner

CODE SCANNING SECURITY CHECK METHOD AND APPARATUS

CROSS REFERENCE TO RELATED APPLICATION

The present application is a continuation of U.S. patent application Ser. No. 16/124,001 filed on Sep. 6, 2018, entitled "CODE SCANNING SECURITY CHECK METHOD AND APPARATUS," which is based on and claims priority to Chinese Patent Application No. 201710807825.8, filed on Sep. 8, 2017, each of which is incorporated herein by reference in its entirety.

TECHNICAL FIELD

This disclosure relates to the technical field of networks, and specifically to a code scanning security check method and apparatus.

BACKGROUND

With the rapid development of computer technologies, people's lives are becoming increasingly convenient. For example, many transactions have begun to use code scanning functions, and it is possible to obtain relevant transaction information and execute corresponding transactions through scanning. Taking payment applications as an example, code scanning payments are becoming increasingly widely employed in people's daily lives. The user does not need to use cash when making a payment; it is possible to complete a payment by scanning the payee's payment receipt code. Also, current payment receipt codes can display the payee's profile picture in the middle of the code, for the payee to identify their own payment receipt code. While code scanning modes are convenient for users, the issue of how to safeguard the security of code scanning mode is a problem that urgently needs to be addressed.

SUMMARY

In view of this, this disclosure provides a code scanning security check method and apparatus, to improve the security of code scanning transactions.

Specifically, one or more embodiments of this disclosure are achieved through the following technical schemes.

First, a code scanning security check method is provided, the method comprising: receiving a transaction request sent by a client through code scanning, and obtaining a scan code sent by the client and corresponding to a transaction, and a scan code used for checking the check code; obtaining a check code with a mapping relationship to the scan code, based on the scan code; comparing the check code obtained through mapping to the check code sent by the client, and if the check code obtained through mapping and the check code sent by the client are the same, permitting the execution of the transaction; if the check code obtained through mapping and the check code sent by the client are not the same, denying the execution of the transaction.

Second, a code scanning processing method is provided, the method comprising: sending a code generation request to a server, the code generation request being used to request the server to generate a transaction code corresponding to a code scanning transaction; receiving the transaction code returned by the server for the code scanning transaction, the transaction code comprising: a scan code and a check code used to check the scan code; displaying the transaction code.

Third, a code scanning security check apparatus is provided, the apparatus comprising: a request receiving module, configured to receive a transaction request sent by a client through code scanning, and obtaining a scan code sent by the client and corresponding to a transaction, and a scan code used for checking the check code; a mapping processing module, configured to obtain a check code with a mapping relationship to the scan code, based on the scan code; a match checking module, configured to compare the check code obtained through mapping to the check code sent by the client, and if the check code obtained through mapping and the check code sent by the client are the same, permitting the execution of the transaction; if the check code obtained through mapping and the check code sent by the client are not the same, denying the execution of the transaction.

Fourth, a code scanning processing apparatus is provided, the apparatus comprising: a request sending module, configured to send a code generation request to a server, the code generation request being used to request the server to generate a transaction code corresponding to a code scanning transaction; a code receiving module, configured to receive the transaction code returned by the server for the code scanning transaction, the transaction code comprising: a scan code and a check code used to check the scan code; a code display module, configured to display the transaction code.

Fifth, a security check device is provided, the device comprising a memory, a processor, and computer readable instructions stored in the memory and executable by the processor, and achieving the following steps when the processor executes the instructions: receiving a transaction request sent by a client through code scanning, and obtaining a scan code sent by the client and corresponding to a transaction, and a scan code used for checking the check code; obtaining a check code with a mapping relationship to the scan code, based on the scan code; comparing the check code obtained through mapping to the check code sent by the client, and if the check code obtained through mapping and the check code sent by the client are the same, permitting the execution of the transaction; if the check code obtained through mapping and the check code sent by the client are not the same, denying the execution of the transaction.

Sixth, a code scanning processing device is provided, the device comprising a memory, a processor, and computer readable instructions stored in the memory and executable by the processor, and achieving the following steps when the processor executes the instructions: sending a code generation request to a server, the code generation request being used to request the server to generate a transaction code corresponding to a code scanning transaction; receiving the transaction code returned by the server for the code scanning transaction, the transaction code comprising: a scan code and a check code used to check the scan code; displaying the transaction code.

Seventh, a transaction code identification method is provided, the method comprising: scanning a transaction code, the transaction code comprising: a two-dimensional code and a check code identifiable through human vision; parsing the two-dimensional code to obtain a two-dimensional code content contained in the two-dimensional code; obtaining the check code; sending the two-dimensional code content and the check code to a server.

Eighth, a transaction code verification method is provided, the method comprising: receiving a transaction code content of a transaction code sent by a client, the transaction code comprising: a two-dimensional code and a check code, the transaction code content comprising: two-dimensional code content included in the two-dimensional code, and the check code; using a mapping algorithm to obtain a corresponding mapped check code, based on the two-dimensional code content; comparing the mapped check code to the check code in the transaction code content, and determining that the transaction code has been successfully verified if the mapped check code and the check code in the transaction code content match. In one embodiment, the check code is identifiable through human vision.

Ninth, a transaction code display device is provided, the device comprising a memory, a processor, and computer readable instructions stored in the memory and executable by the processor, and achieving the following when the processor executes the instructions: displaying a transaction code, the transaction code comprising: first area and second area, the first area comprising a two-dimensional code, and the second area comprising a check code. In one embodiment, the check code is identifiable through human vision.

Tenth, a code scanning payment method is provided, the method comprising: a server receiving a payment request sent by a payer client, the payment request comprising: a two-dimensional code content and a check code contained in a payee's payment receipt code; the server using a mapping algorithm to obtain a corresponding mapped check code, based on the two-dimensional code content; the server obtaining the payee's account based on the two-dimensional code content if the mapped check code and the check code match, and executing a payment from the payer's payment account to the payee's account.

Eleventh, a transaction code verification device is provided, the device comprising a memory, a processor, and computer readable instructions stored in the memory and executable by the processor, and achieving the following steps when the processor executes the instructions: receiving a transaction code content of a transaction code sent by a client, the transaction code comprising: a two-dimensional code and a check code, the transaction code content comprising: a two-dimensional code content included in the two-dimensional code, and the check code; using a mapping algorithm to obtain a corresponding mapped check code, based on the two-dimensional code content; comparing the mapped check code to the check code in the transaction code content, and determining that the transaction code has been successfully verified if the mapped check code and the check code in the transaction code content match. In one embodiment, the check code is identifiable through human vision.

Twelfth, a code scanning device is provided, the device comprising a memory, a processor, and computer readable instructions stored in the memory and executable by the processor, and achieving the following steps when the processor executes the instructions: scanning a transaction code, the transaction code comprising: a two-dimensional code and a check code; parsing the two-dimensional code to obtain a two-dimensional code content contained in the two-dimensional code; obtaining the check code; sending the two-dimensional code content and the check code to a server. In one embodiment, the check code is identifiable through human vision.

According to another aspect, a transaction code identification method comprises: scanning a transaction code, the transaction code comprising: a two-dimensional code and a check code; parsing the two-dimensional code to obtain a two-dimensional code content contained in the two-dimensional code; obtaining the check code; and sending the two-dimensional code content and the check code to a server to cause the server to verify the transaction code based on the two-dimensional code content and the check code. In one embodiment, the check code is identifiable through human vision.

In some embodiments, the transaction code comprises a first area and a second area, the first area comprising the two-dimensional code, and the second area comprising the check code. In one example, the second area is surrounded by the first area. In another example, the second area is located at a periphery of the first area.

In some embodiments, the two-dimensional code and the check code are contained in a payee's payment receipt code; and the two-dimensional code is the payee's identifier.

In some embodiments, the check code comprises at least one of a letter or a digit.

According to another aspect, a transaction code verification method comprises: receiving a transaction code sent by a client, the transaction code comprising: a two-dimensional code and a check code; using a mapping algorithm to obtain a mapped check code corresponding to the two-dimensional code; and comparing the mapped check code to the check code in the transaction code, and determining that the transaction code has been successfully verified if the mapped check code and the check code in the transaction code match. In one embodiment, the check code is identifiable through human vision.

In some embodiments, the ransaction code verification method further comprises: if the mapped check code and the check code in the transaction code match, obtaining a payee's account based on the two-dimensional code and executing a transaction from a payer's payment account to the payee's account.

In some embodiments, the ransaction code verification method further comprises: sending risk warning information to the client if the mapped check code and the check code in the transaction code do not match.

According to another aspect, a system comprises a processor and a non-transitory computer-readable storage medium storing instructions that, when executed by the processor, cause the processor to perform a transaction code identification method, the method comprising: scanning a transaction code, the transaction code comprising: a two-dimensional code and a check code; parsing the two-dimensional code to obtain a two-dimensional code content contained in the two-dimensional code; obtaining the check code; and sending the two-dimensional code content and the check code to a server to cause the server to verify the transaction code based on the two-dimensional code content and the check code. In one embodiment, the check code is identifiable through human vision.

According to another aspect, a system comprises a processor and a non-transitory computer-readable storage medium storing instructions that, when executed by the processor, cause the processor to perform a transaction code identification method, the method comprising: receiving a transaction code sent by a client, the transaction code comprising: a two-dimensional code and a check code; using a mapping algorithm to obtain a mapped check code corresponding to the two-dimensional code; and comparing the mapped check code to the check code in the transaction code, and determining that the transaction code has been successfully verified if the mapped check code and the check code in the transaction code match. In one embodiment, the check code is identifiable through human vision.

By adding a check code, the code scanning security check method and apparatus of one or more embodiments of this disclosure enable a server to verify whether a scan code is secure based on a check code, thereby improving the security of scan transactions.

BRIEF DESCRIPTION OF THE DRAWINGS

To more clearly explain one or more embodiments of this disclosure or technical schemes of the prior art, a simple introduction to the accompanying drawings required in the descriptions of the embodiment or prior art is given below. Clearly, the accompanying drawings in the following descriptions are merely a few embodiments recorded in one or more embodiments of this disclosure. For a person having ordinary skill in the art without creative labor, it is possible to obtain other accompanying drawings based on these accompanying drawings.

DETAILED DESCRIPTION

To enable a person in this technical field to better understand the technical schemes in one or more embodiments of this disclosure, in combination with the accompanying drawings of one or more embodiments of this disclosure, a clear and comprehensive description of the technical schemes in one or more embodiments of this disclosure is given below. The described embodiments are merely a portion of the embodiments, and are not all of embodiments. Based on one or more embodiments of this disclosure and without creative labor, all other embodiments obtained by a person having ordinary skill in the art shall fall within the scope of protection of this disclosure.

The popularization of code scanning modes has made people's lives vastly more convenient. Using code scanning and obtaining code information, it is possible to achieve the corresponding code scanning transaction. For example, code scanning modes are widely used in operations such as payment collection, payment submission, and opening websites. However, while bringing convenience, code scanning also engenders security threats; because people cannot recognize the codes, there is no way of knowing if one's own scan code has been swapped.

Taking a payment receipt code formatted as a two-dimensional code as an example, an illegal user can use a payee's two-dimensional code as their own two-dimensional code, and the payee has no way of knowing that their code has been swapped, causing financial loss.

As another example, a given scan code can serve as the user identifier of a transaction side user, and the transaction side can send a rather important piece of transaction information to the user based on this identifier. If the scan code is swapped by an illegal user, it could lead to losing information.

Therefore, in terms of safeguarding code scanning security, a scan code server needs to be able to promptly identify the alteration when a scan code is swapped, to safeguard transaction user security. Here, "scan code" does not only include the use of two-dimensional codes; it can also be the use of other code modes and standard codes, e.g., various types of codes such as *chrysanthemum* code, ring code, and ghost code.

Figure 1:
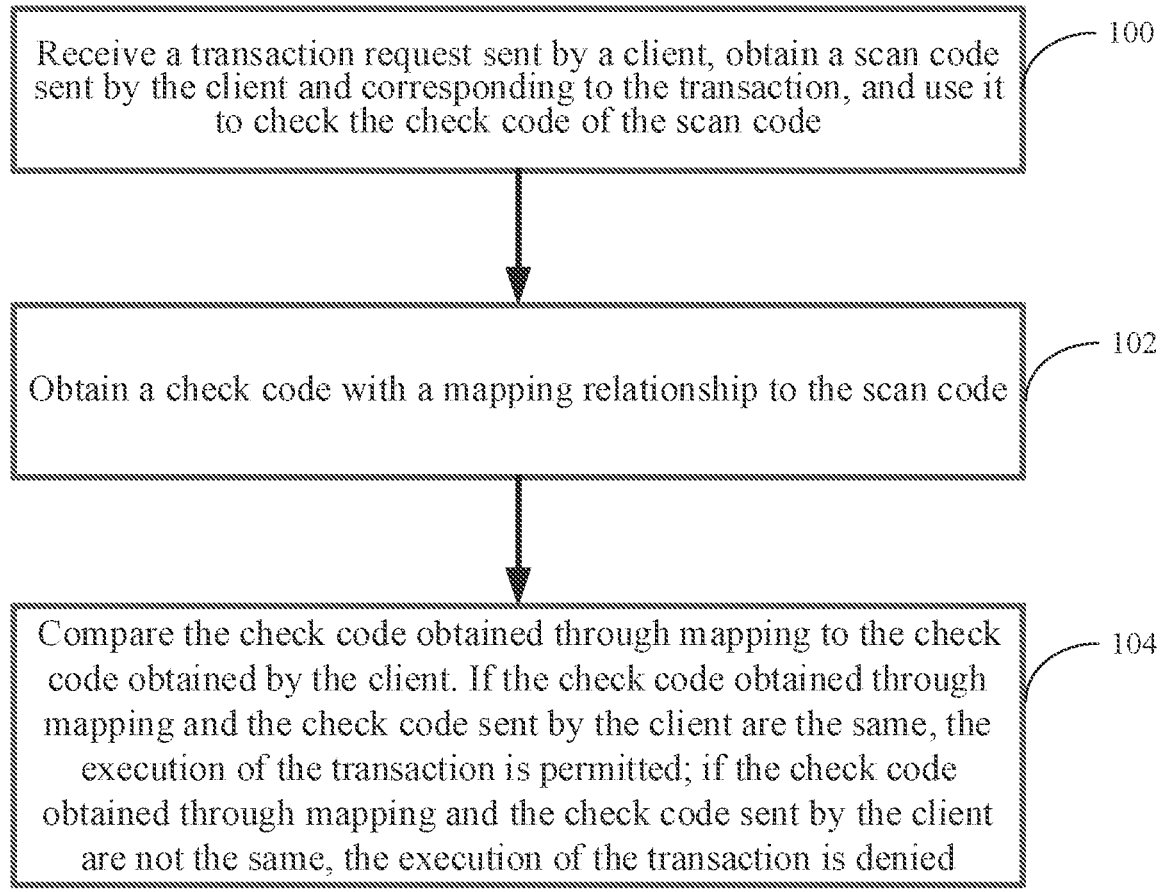
FIG. 1 is a flow chart of a code scanning security check method provided by one or more embodiments of this disclosure.

This disclosure provides a method to address this issue, enabling a server to identify changes in a scan code when a client scans a code, to guarantee code scanning security, and, as far as possible, enabling a client side user to identify scan code changes. FIG. 1 shows the flow of this method. This method can be executed by a server corresponding to a code scanning transaction. As shown in FIG. 1, this method may comprise the following steps.

In Step 100, receiving a transaction request sent by a client through code scanning, and obtaining a scan code sent by the client and corresponding to the transaction, and a scan code used for checking the check code.

In some embodiments, when a client scans a code, it generally corresponds to a certain type of transaction to be executed. Taking code scanning payments as an example, a user goes shopping at a supermarket and opens payment software to make a code scanning payment when checking out. After the user scans the payment receipt code, the payment software client sends a payment request to the corresponding payment software server, and that server can execute this flow, to determine whether this payment transaction is secure.

In this step, the scan code can be the two-dimensional code mentioned above, or another code mode or standard code can be used, e.g., various types of codes such as *chrysanthemum* code, ring code, and ghost code. The check code can be a code displayed along with the scan code. For example, still using a payment receipt code as an example, a merchant can display a scan code on a paper receipt for the paying user to scan, and a check code can be displayed together with it on this paper receipt. During code scanning, both the scan code and check code can be sent to a server, and the server can check whether the scan code is secure based on the check code. In this example, the check code sent by the client during a transaction request is called the first check code, and this first check code can be used to check the scan code.

In addition, the check code of this example can be a check code identifiable through human vision. This check code may comprise at least one combination of elements identifiable by human eyes. Here, "elements identifiable by human eyes" means that if these elements change, human eyes can identify the change in the elements. For example, it could be an alphanumeric combination "AB68", or it could be a combination of different colored graphics, joining together a red triangle, a green square, and a black circle. Regardless of the type of combination of the check code, what is required is for human eyes to be able to identify changes in the check code. For example, if "AB68" on the merchant's paper receipt changes to "CD76", the merchant will be able to identify this change by eyes. As for illegal users, if an illegal user wants to swap the two-dimensional code in a merchant's payment receipt code, in order to be verified by the server, it is also necessary to swap the check code, but replacing the check code would be discovered by the merchant. Therefore, employing a check code of combined elements that are identifiable by human eyes helps a merchant monitor the security of its own payment receipt codes.

The mode by which a server obtains a scan code and check code sent by a client can also be flexibly selected. For example, it is possible to send scan code and check code contents obtained through parsing to a server when a client scans a code; it is also possible for a client to send a client-scanned image of the scan code and check code to a server, for the server to parse and obtain the scan code and check code content, such as information in a two-dimensional code or numbers in a check code. In addition, check code acquisition can be scanned and obtained by a client, or can be input by a user into a client.

In Step 102, a check code with a mapping relationship to the scan code is obtained.

In this example, a server can obtain a check code with a mapping relationship to a scan code. For example, after a server receives a scan code sent by a client, the server can use a given mapping algorithm to obtain a check code corresponding to the scan code. After a server receives a scan code sent by a client, the check code obtained based on the scan code and using a mapping algorithm can be called the second check code.

In Step 104, the check code obtained through mapping is compared to the check code obtained by the client, and if the check code obtained through mapping and the check code sent by the client are the same, the execution of the transaction is permitted; if the check code obtained through mapping and the check code sent by the client are not the same, the execution of the transaction is denied.

For example, if the second check code obtained by the server through mapping is the same as the first check code obtained by the client, it indicates that the scan code truly is the code of the payee, this transaction is secure, and payment may be continued. If the two check codes are different, the scan code may have been replaced, and this transaction is risky.

In the method of this example, a check code is added, enabling a server to verify the security of a scan code based on the check code, thereby improving scan transaction security.

As described below, a payment receipt code is taken as an example to give a detailed description of the method of this disclosure, including the display of the payment receipt code and payment receipt code checking. However, it is understood that the method of this disclosure can also be applied to code scanning transactions in other application scenarios. The payment receipt code below includes a scan code and check code. Here, the scan code is described as a two-dimensional code, and this two-dimensional code can include a payee identifier.

Figure 2:
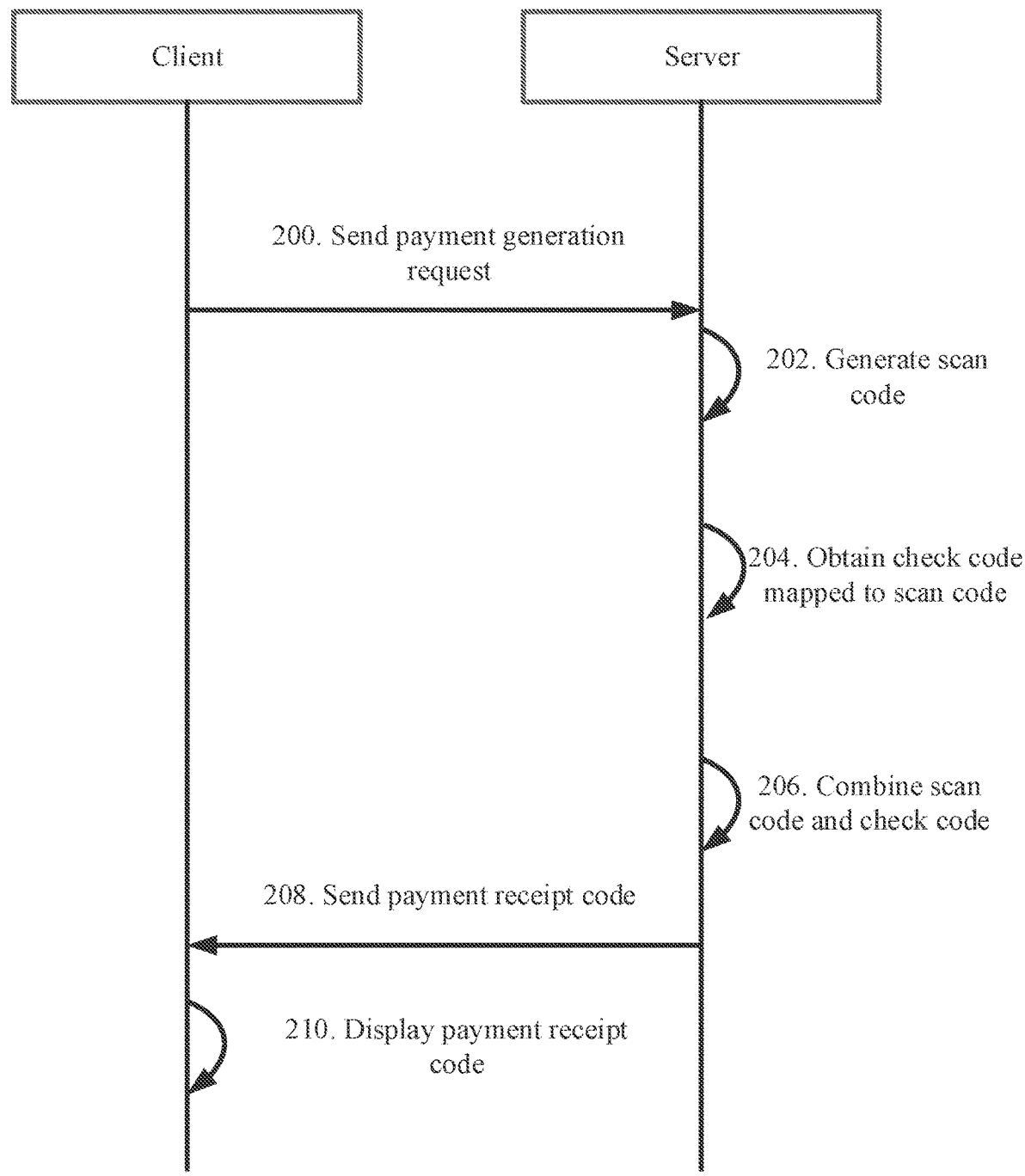
FIG. 2 is a generation process of a payment receipt code provided by one or more embodiments of this disclosure.

Payment receipt code generation process:

FIG. 2 gives an example of a payment receipt code generation process. As shown in FIG. 2, the generation process may comprise the following steps.

In Step 200, a client sends a code generation request to a server.

For example, a payee can use its own payment software client, click on the payment collection option in the client, and trigger the sending of a code generation request to a server by the client, to ask the server to generate a unique, corresponding payment receipt code for this payee. In this example, the payment receipt code may comprise a two-dimensional code plus a check code, and the two-dimensional code can include a unique payee identifier for the server to identify this payee. In this example, this payment receipt code can be called the transaction code.

In Step 202, the server generates a scan code corresponding to this client, based on this request.

This step can employ conventional two-dimensional code generation logic, the details of which are omitted here. This scan code is a two-dimensional code in the payment receipt code, including a payee identifier.

In Step 204, the server obtains a check code with a mapping relationship to the scan code.

For example, the server can use a mapping algorithm to obtain a check code corresponding to the scan code. In one example, the mapping algorithm can be a hash algorithm (also called a hash function). Using the hash algorithm, it is possible to generate a unique piece of characteristic data of a fixed-length for any data. For example, the hash algorithms may include MD5, SHA-1, SHA-2, SHA-256, and SHA-512.

To prevent overly simple original data prior to hashing from leading to reverse-guess attacks from hackers, it is generally possible to add a rather complex string of random characters, called "salt," to a specific location in the original data prior to using the hash function, to boost the complexity of the original data.

In this example, the content of the user's two-dimensional code is the original data. A salt is added to it, and a hash function is used to generate a hash value, and the last four bits are retrieved to serve as the check code data. Using the uniqueness and the avalanche effect of the hash algorithm (avalanche effect refers to that even the smallest change in input can lead to alteration of the output indistinguishishability), it is possible to generate a check code with suitable uniqueness and randomness. The hash algorithms are just one example. It is also possible to employ other mapping algorithms.

Also, the check code has a very low repetition rate. Using English alphanumeric combinations as an example, using a 4-character combination chosen from (A-Z) and (0-9), the repetition rate is 1/1,000,000; using a 2-character combination chosen from (A-Z) and (0-9), the repetition rate is 1/1000.

As an example, the check code generated in this step can be AB68.

In Step 206, a server confirms the combination mode of a scan code and corresponding check code.

In this step, the server can also combine the scan code and check code, to yield a payment receipt code.

Figure 3:
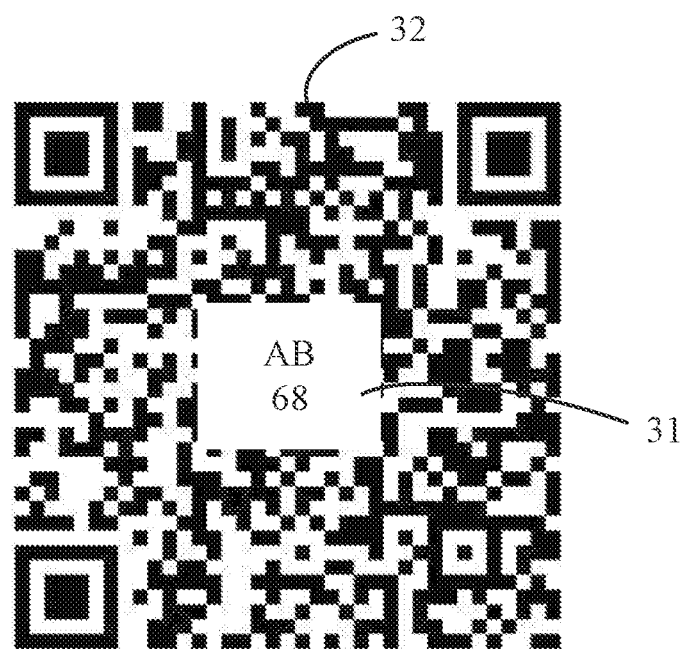
FIG. 3 is a scan code and check code combination mode provided by one or more embodiments of this disclosure.

FIG. 3 gives an example of a scan code and check code combination mode. In this mode, the check code can be displayed in the scan code's code region. As shown in FIG. 3, the check code 31 (using AB68 as an example) can be set in the center region of the scan code 32. Thus, payment software can simultaneously obtain this scan code and check code with one scan. The check code and scan code combination shown in FIG. 3 is a payment receipt code.

Figure 4:
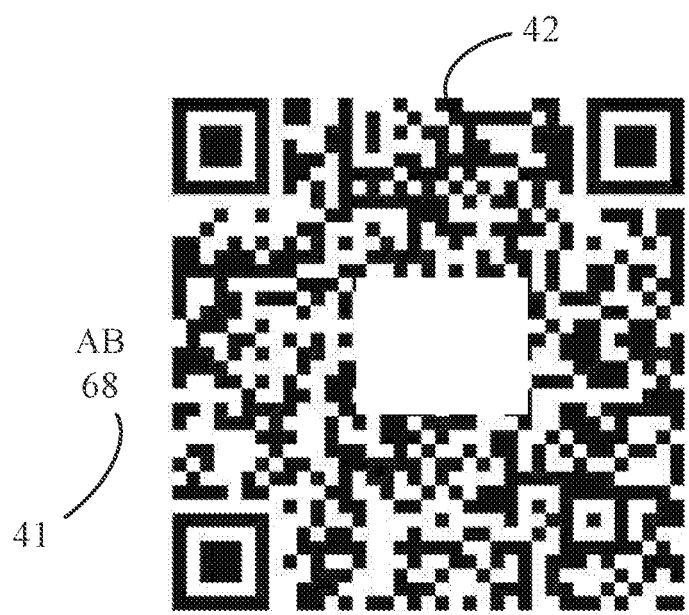
FIG. 4 is a scan code and check code combination mode provided by one or more embodiments of this disclosure.

FIG. 4 gives an example of another scan code and check code combination mode. In this mode, the check code can be displayed at the periphery of the scan code. As shown in FIG. 4, the check code 41 can also be set in the outside region of the two-dimensional code 42, near the location of the two-dimensional code 42. Thus, when a user uses payment software to perform scanning, by suitably enlarging the scanning scope, it is also possible to simultaneously scan and obtain the scan code and check code. Or, even if it is not possible to simultaneously scan the code, the user can manually input the check code to report to the server. There are other combination modes that will not be listed. For example, it is also possible to set the check code within the region of the two-dimensional code, in a region outside the center region, as long as not interfering with the fault tolerance performance of the two-dimensional code.

In addition, the preceding examples merely describe scan code and check code combination modes. In actual implementations, in addition to the scan code and check code, the payment receipt code may also comprise other elements. For example, the payment receipt code may comprise the profile picture and name of the payment collection merchant. These elements may be displayed at the periphery of the two-dimensional code.

In Step 208, a server sends a combined check code and scan code to a client.

In Step 210, the client displays the scan code and check code.

In this step, it is only necessary for the client to display the combination payment receipt code. For example, the client may display the payment receipt code given as an example in FIG. 3. A payment may be made to a merchant as long as the paying user can scan this payment receipt code.

After the client obtains the payment receipt code, a merchant using the client can display this payment receipt code on a paper receipt, allowing a payer to scan this payment receipt code to make a payment. The merchant can be alerted to pay attention to this check code. If there is a change in the check code, it indicates that the merchant's payment receipt code has the risk of having been replaced.

Figure 5:
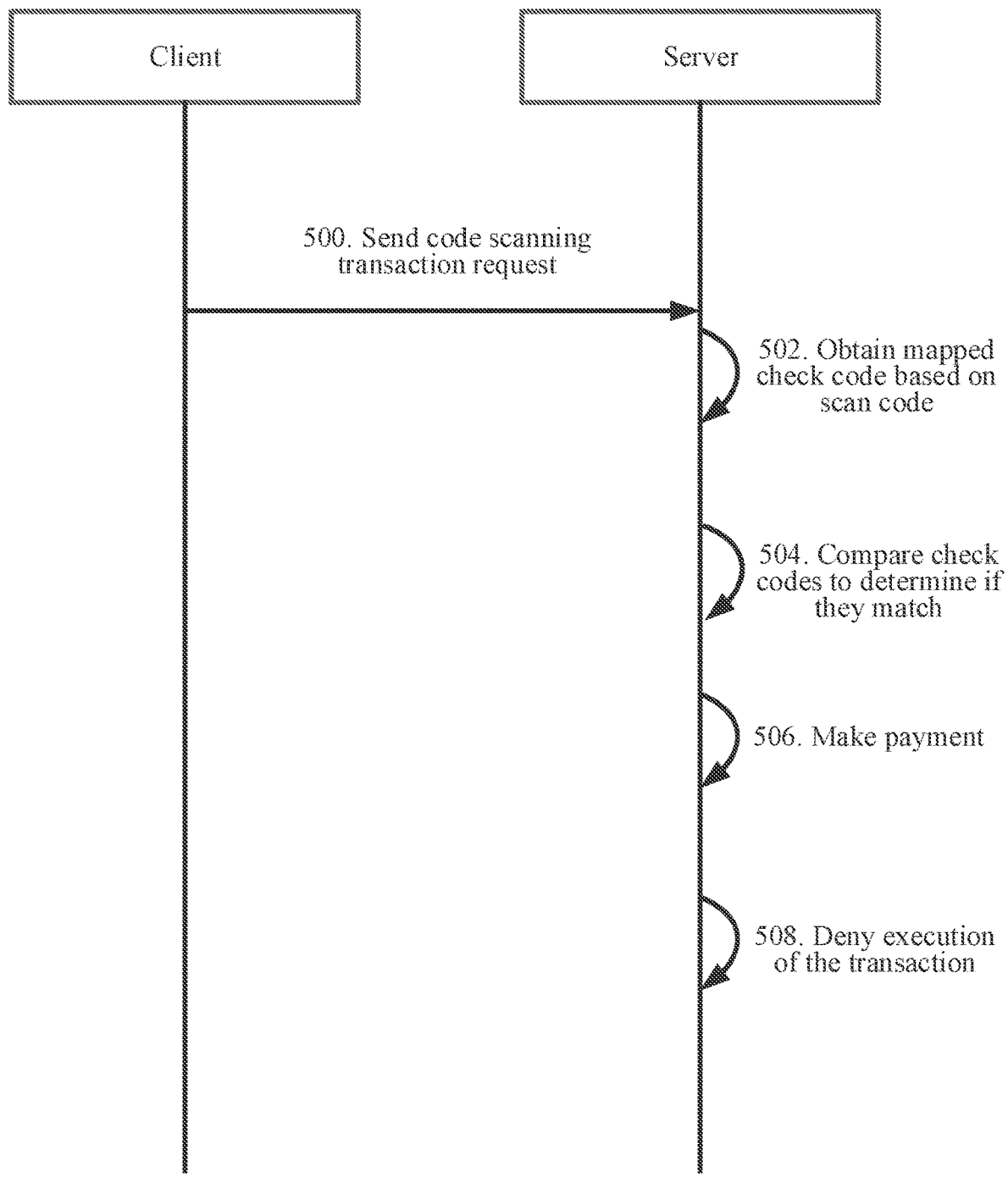
FIG. 5 is a payment receipt code use process provided by one or more embodiments of this disclosure.

Payment receipt code usage process:

The following further describes the use of a payment receipt code. Using the payment receipt code shown in FIG. 3 as an example, when a payer scans this payment receipt code and pays a merchant, the flow shown in FIG. 5 can be executed.

In Step 500, a client uses a code scanning to send a transaction request to a server.

For example, when a payer has finished shopping and wants to make a payment, the payer may open payment software on the mobile phone and scan the merchant's payment receipt code, then a client sends a transaction request to a server, indicating that a payment is to be made. Here, the client can be a payment software client, and the server can be a payment software server.

In this step, using the payment receipt code shown in FIG. 3 as an example, after scanning the payment receipt code, the client can parse the two-dimensional code in the payment receipt code and obtain the payee identifier contained therein. Also, the client can use image recognition to obtain check code AB68 from the payment receipt code. Also, identifier contained sends the obtained two-dimensional code and check code contents (e.g., identifier, AB68) to the server, enabling the server to perform a security check on this code scanning payment. In other examples, the client can send a scanned image of the payment receipt code to the server, for the server to perform two-dimensional code parsing and image recognition to obtain the payee identifier and check code content.

In Step 502, the server obtains a mapped, corresponding check code based on the scan code.

In one example, the server can perform a hash operation based on the received scan code, i.e., the payee identifier in the two-dimensional code obtained in Step 501, obtain a hash value mapped and corresponding to the two-dimensional code content, and can retrieve the last four bits of the hash value, which is the check code.

In Step 504, the server compares the check code obtained through mapping with the check code obtained from the client to determine whether they are the same.

As discussed above, the check code received in Step 500 can be obtained from the client's scan code and transmitted to the server, and the check code in Step 502 can be obtained by the server through the execution of a mapping algorithm, based on the scan code transmitted by the client. In this step, the server can compare these two check codes and determine whether the two are the same.

If they are the same, Step 506 is executed; if not, Step 508 is executed.

In Step 506, the server executes the payment collection transaction for this code scan.

If the check code transmitted by the client is the same as the check code obtained by the server based on a mapping algorithm, it means that the client's scan code truly is the payee, and the execution of this code scanning payment transaction may be permitted. It is sufficient to continue to make the payment in accordance with conventional payment logic.

In Step 508, the server denies the execution of the transaction.

If the check code transmitted by the client is the same as the check code obtained by the server based on a mapping algorithm, it means that the payee's two-dimensional code may have been replaced by an illegal user. The server can refuse to execute this payment and can send risk warning information to the client. For example, the server can send a text notification to the mobile phone, to alert the payee that the scan code for this transaction poses a risk. In addition, the server can report this risky scan code to a risk control platform.

In the method of this example, adding a check code to the payment receipt code enables the server to verify whether the payment receipt code is secure based on a comparison of check codes, thereby improving the security of code scanning payment transactions.

Figure 6:
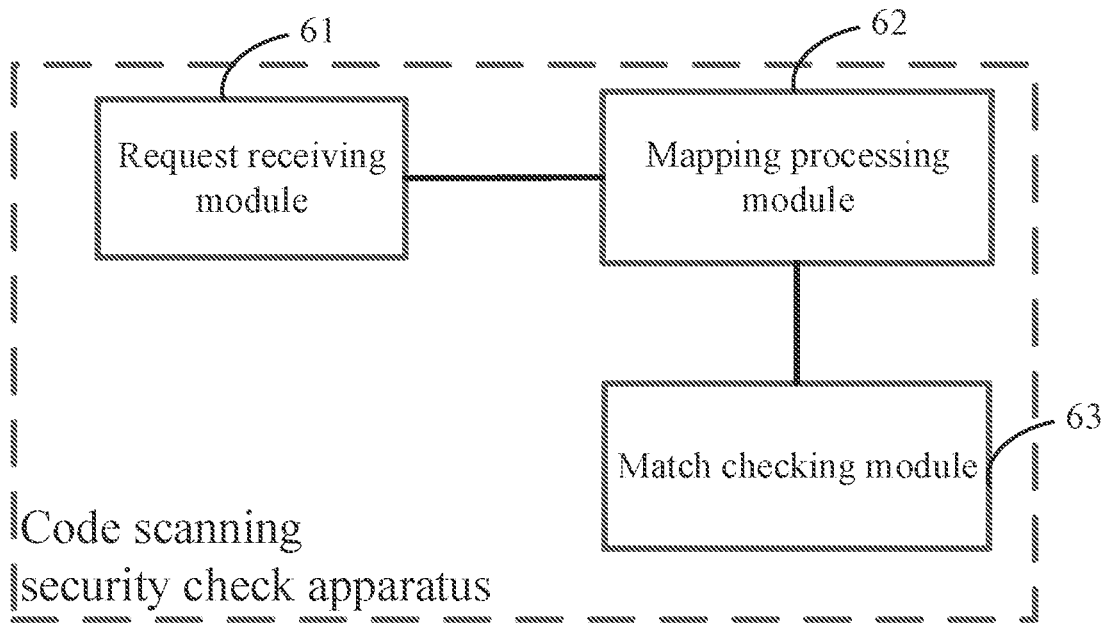
FIG. 6 is a structural diagram of a code scanning security check apparatus provided by one or more embodiments of this disclosure.

To achieve this code scanning security check method, this disclosure provides a code scanning security check apparatus. As shown in FIG. 6, this apparatus may comprise: a request receiving module 61, a mapping processing module 62, and a match checking module 63.

The request receiving module 61 is configured to receive a transaction request sent by a client through code scanning and obtain a scan code sent by the client and corresponding to this transaction, the scan code used for checking the check code.

The mapping processing module 62 is configured to obtain a check code with a mapping relationship to the scan code, based on the scan code.

The match checking module 63 is configured to compare the check code obtained through mapping to the check code sent by the client; if the check code obtained through mapping and the check code sent by the client are the same, the execution of this transaction is permitted, and if the check code obtained through mapping and the check code sent by the client are not the same, the execution of this transaction is denied.

In one example, the scan code comprises: a two-dimensional code.

In one example, the check code comprises: at least one combination of elements identifiable by human eyes.

Figure 7:
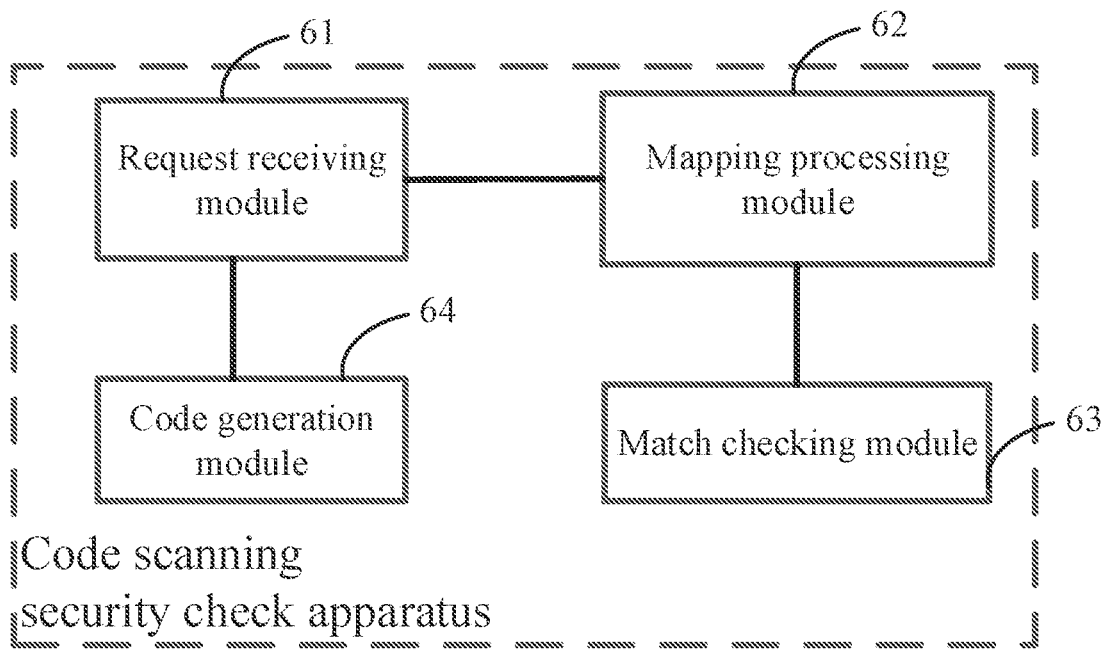
FIG. 7 is a structural diagram of a code scanning security check apparatus provided by one or more embodiments of this disclosure.

In one example, as shown in FIG. 7, the code scanning security check apparatus may also comprise: a code generation module 64.

The request receiving module 61 is also configured to receive a code generation request sent by the client.

The code generation module 64 is configured to generate a scan code corresponding to the client based on the code generation request; obtain a check code with a mapping relationship to the scan code; and combine the scan code with the check code and send the combined to the client for display.

The various modules and units of the code scanning security check apparatus may be implemented as software instructions. That is, the code scanning security check apparatus may comprise a processor and a non-transitory computer-readable storage medium storing instructions that, when executed by the processor, cause the code scanning security check apparatus to perform various steps and methods of the modules and units described above. In some embodiments, the code scanning security check apparatus may include a computer, a server, etc.

In some embodiments, a non-transitory computer-readable storage medium stores instructions that, when executed by a processor, cause the processor to perform a transaction code identification method, the method comprising: receiving a transaction code sent by a client, the transaction code comprising: a two-dimensional code and a check code identifiable through human vision; using a mapping algorithm to obtain a mapped check code corresponding to the two-dimensional code; and comparing the mapped check code to the check code in the transaction code, and determining that the transaction code has been successfully verified if the mapped check code and the check code in the transaction code match.

Figure 8:
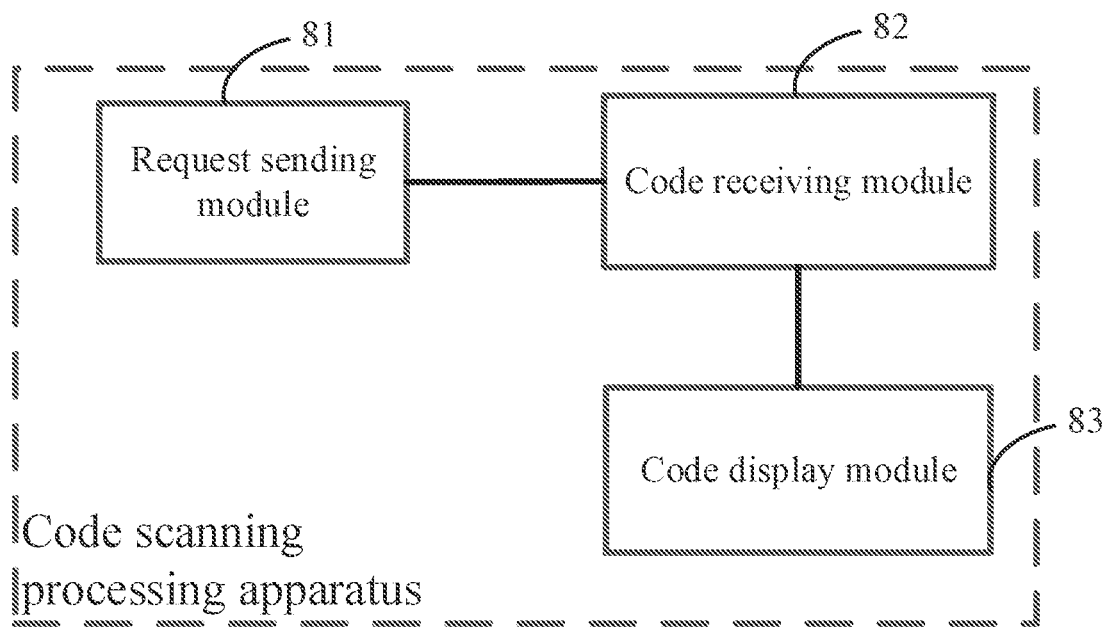
FIG. 8 is a structural diagram of a code scanning security check apparatus provided by one or more embodiments of this disclosure.

To achieve the code scanning processing method described above, this disclosure provides a code scanning processing apparatus. As shown in FIG. 8, this apparatus may comprise: a request sending module 81, a code receiving module 82, and a code display module 83.

The request sending module 81 is configured to send a code generation request to a server, the code generation request being used to request the server to generate a transaction code corresponding to a code scanning transaction.

The code receiving module 82 is configured to receive the transaction code returned by the server for the code scanning transaction, the transaction code comprising: a scan code and a check code used to check the scan code.

The code display module 83 is configured to display the transaction code.

Figure 9:
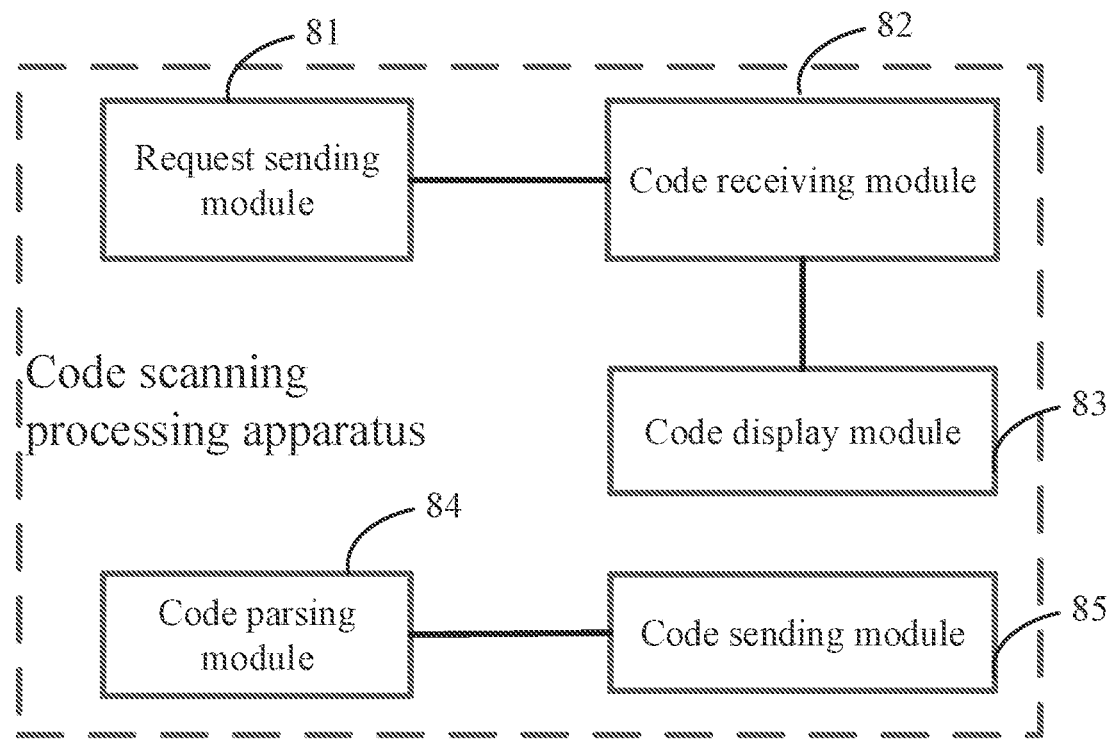
FIG. 9 is a structural diagram of a code scanning security check apparatus provided by one or more embodiments of this disclosure.

In one example, as shown in FIG. 9, the code scanning processing apparatus may also comprise: a code parsing module 84 and a code sending module 85.

The code parsing module 84 is configured to parse the scanned transaction code and obtain the scan code and check code.

The code sending module 85 is configured to send the scan code and check code to a server to perform checking.

The various modules and units of the code scanning processing apparatus may be implemented as software instructions. That is, the code scanning processing apparatus may comprise a processor and a non-transitory computer-readable storage medium storing instructions that, when executed by the processor, cause the code scanning processing apparatus to perform various steps and methods of the modules and units described above. In some embodiments, the code scanning processing apparatus may include a computer, a mobile phone, a pad, etc.

In some embodiments, a non-transitory computer-readable storage medium stores instructions that, when executed by a processor, cause the processor to perform a transaction code identification method, the method comprising: scanning a transaction code, the transaction code comprising: a two-dimensional code and a check code identifiable through human vision; parsing the two-dimensional code to obtain a two-dimensional code content contained in the two-dimensional code; obtaining the check code; and sending the two-dimensional code content and the check code to a server to cause the server to verify the transaction code based on the two-dimensional code content and the check code.

For ease of description, the various modules of the above apparatus are described based on functions. When implementing one or more embodiments of this disclosure, the functions of the different modules may be achieved through one or more software and/or hardware components.

The order in which the steps in the flow shown for the embodiments of this method are executed is not limited to the order in the flow chart. In addition, the description of each step can be achieved through software, hardware, or a combination of the two. For example, a person skilled in the art may implement these steps in software code form, which can be computer-executable instructions capable of achieving the logic functions corresponding to the steps. When the method is implemented in software form, the executable instructions can be stored in a memory and can be executed by a processor in a device.

For example, corresponding to the aforementioned code scanning security check method, one or more embodiments of this disclosure simultaneously provide a security check device. This device may comprise a processor, a memory, and computer readable instructions stored in the memory and executable by the processor, with the processor, by executing the instructions, being used to achieve the following steps: receiving a transaction request sent by a client through code scanning, and obtaining a scan code sent by the client and corresponding to this transaction, and a scan code used for checking the check code; obtaining a check code with a mapping relationship to the scan code, based on the scan code; comparing the check code obtained through mapping to the check code sent by the client, and if the check code obtained through mapping and the check code sent by the client are the same, permitting the execution of this transaction; if the check code obtained through mapping and the check code sent by the client are not the same, denying the execution of this transaction.

For example, corresponding to the aforementioned code scanning processing method, one or more embodiments of this disclosure simultaneously provide a code scanning processing device. This device may comprise a processor, a memory, and computer readable instructions stored in the memory and executable by the processor, when the processor executes the instructions, being used to achieve the following steps: sending a code generation request to a server, the code generation request being used to request the server to generate a transaction code corresponding to a code scanning transaction; receiving the transaction code returned by the server for the code scanning transaction, the transaction code comprising: a scan code and a check code used to check the scan code; displaying the transaction code.

The apparatus or modules illustrated in the above embodiment can be achieved by a computer chip or entity, or by a product possessing certain functions. A typical implementation device is a computer. The specific form of the computer may be a personal computer, laptop computer, cell phone, camera phone, smart phone, personal digital assistant, media player, navigation device, email device, game console, tablet computer, wearable device, or a combination of any of these devices.

Figure 10:
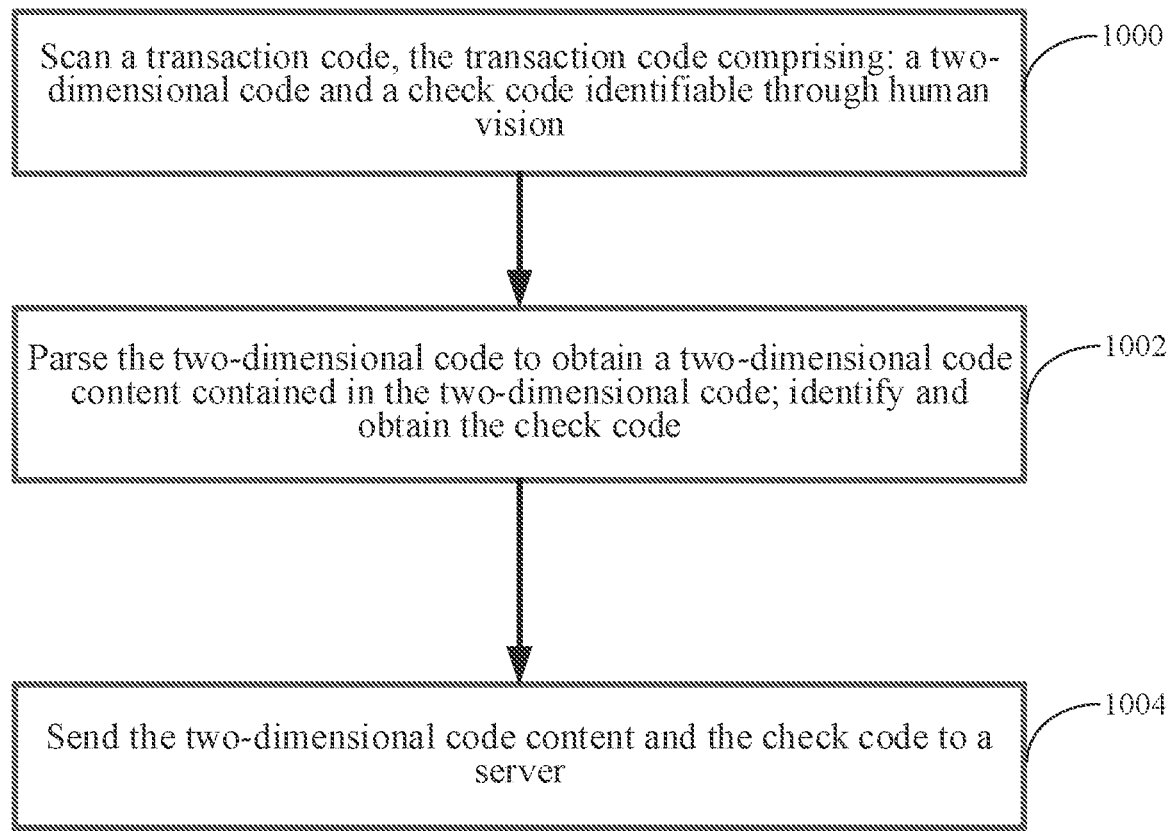
FIG. 10 is a flow chart of a transaction code identification method provided by one or more embodiments of this disclosure.

Based on the above descriptions, a simple illustration of several methods and devices is presented below. A detailed description can be made by referring to the preceding descriptions of the method and device embodiments. One or more embodiments of this disclosure also provide a transaction code identification method. This transaction code may comprise a two-dimensional code and a check code identifiable through human vision. For example, this transaction code can be the payment receipt code shown in FIG. 3 or FIG. 4. The payment receipt code may comprise a scan code and a check code. When a code scanning device is used to scan this transaction code, it is possible to execute the flow shown in FIG. 10, which comprises the following steps.

Step 1000, scanning a transaction code, the transaction code comprising: a two-dimensional code and a check code identifiable through human vision. For example, a code scanning device may be used to scan the payment receipt code shown in FIG. 3. This payment receipt code in FIG. 3 comprises a payee identifier two-dimensional code as well as a check code that is identifiable by human eyes. This check code can be an alphanumeric combination, such as "AB68".

Step 1002, parsing the two-dimensional code to obtain a two-dimensional code content contained in the two-dimensional code; and obtaining the check code. For example, after the code scanning device scans the payment receipt code shown in FIG. 3, parsing can be conducted, parsing and obtaining the two-dimensional code content, and an image recognition mode can be used to obtain the check code "AB68".

Step 1004, sending the two-dimensional code content and the check code to a server.

That is, in some embodiments, a transaction code identification method comprises: scanning a transaction code, the transaction code comprising: a two-dimensional code and a check code identifiable through human vision; parsing the two-dimensional code to obtain a two-dimensional code content contained in the two-dimensional code; obtaining the check code; and sending the two-dimensional code content and the check code to a server to cause the server to verify the transaction code based on the two-dimensional code content and the check code.

Figure 11:
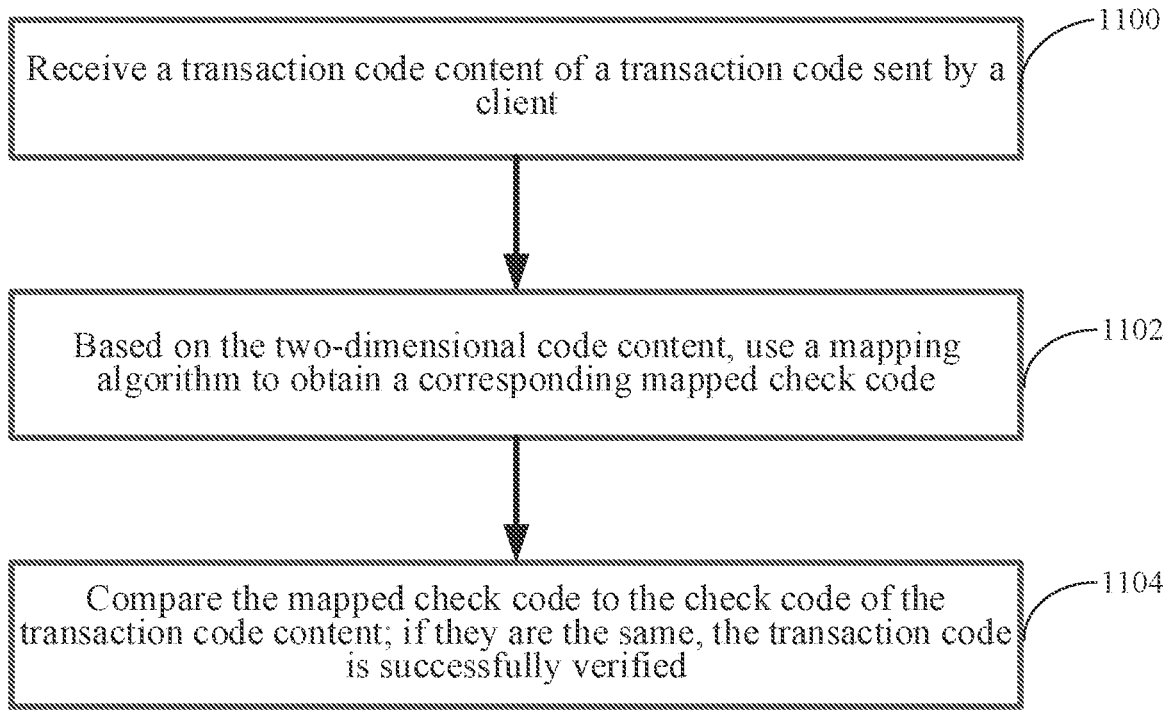
FIG. 11 is a flow chart of a transaction code verification method provided by one or more embodiments of this disclosure.

The server can verify the transaction code and execute the transaction requested by the scanned transaction code when the security of the transaction code has been confirmed. One or more embodiments of this disclosure also provide a transaction code verification method. This transaction code may comprise a two-dimensional code and a check code identifiable through human vision. According to the verification flow shown in FIG. 11, this flow can first verify the security of the transaction code before executing the transaction requested by the scanned transaction code, with execution of the transaction being permitted only after successful verification. This method may comprise the following steps.

Step 1100, receiving a transaction code content of a transaction code sent by a client, the transaction code comprising: a two-dimensional code and a check code identifiable through human vision, the transaction code content comprising: a two-dimensional code content included in the two-dimensional code, and the check code.

Step 1102, using a mapping algorithm to obtain a corresponding mapped check code, based on the two-dimensional code content.

For example, this step can utilize a mapping algorithm to obtain a check code corresponding to the two-dimensional code content. In this example, this check code can be called the mapped check code. For example, the second check code in Step 102 can be called the mapped check code and can be calculated and obtained by a server according to a given mapping algorithm.

Step 1104, comparing the mapped check code to the check code in the transaction code content, and determining that the transaction code has been successfully verified if the mapped check code and the check code in the transaction code content match. For example, successful verification can indicate that the two-dimensional code in the transaction code is secure, e.g., the two-dimensional code has not been replaced by an illegal user. The continued execution of the transaction may be permitted, and payment to the payee's account corresponding to the two-dimensional code may be continued.

That is, in some embodiments, a transaction code verification method comprises: receiving a transaction code sent by a client, the transaction code comprising: a two-dimensional code and a check code identifiable through human vision; using a mapping algorithm to obtain a mapped check code corresponding to the two-dimensional code; and comparing the mapped check code to the check code in the transaction code, and determining that the transaction code has been successfully verified if the mapped check code and the check code in the transaction code match.

Figure 12:
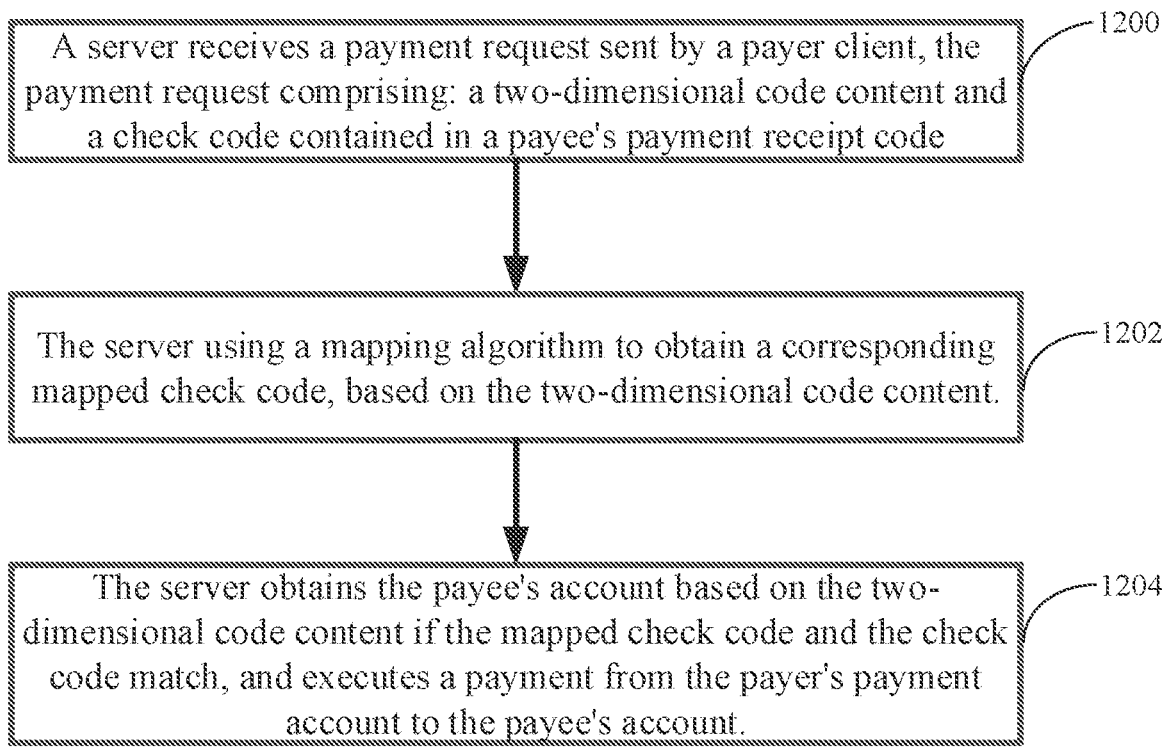
FIG. 12 is a flow chart of a code scanning payment method provided by one or more embodiments of this disclosure.

One or more embodiments of this disclosure also provide a code scanning payment method, and this method may be used to conduct a payment. As shown in FIG. 12, it may comprise the following steps.

Step 1200, a server receiving a payment request sent by a payer client, the payment request comprising: a two-dimensional code content and a check code contained in a payee's payment receipt code.

For example, before a server receives a payment request sent by a payer client, the payer client may scan the payee's payment receipt code, the payment receipt code comprising: a two-dimensional code and a check code identifiable through human vision, the two-dimensional code serving as the payee's identifier. The payer client parses the transaction code to obtain the two-dimensional code content contained in the two-dimensional code, and the check code, and sends them to a server in a payment request.

Step 1202, the server using a mapping algorithm to obtain a corresponding mapped check code, based on the two-dimensional code content.

Step 1204, the server obtaining the payee's account based on the two-dimensional code content if the mapped check code and the check code match, and executing a payment from the payer's payment account to the payee's account. In this step, after the server confirms the security of the two-dimensional code security, the execution of the payment transaction may be continued.

One or more embodiments of this disclosure also provide a transaction code and code scanning device. Here, this transaction code may comprise: a first area and a second area.

The first area comprises: a two-dimensional code serving as a transaction identifier.

The second area comprises: a check code identifiable through human vision, the check code being used to check the security of the two-dimensional code.

For example, this transaction code can be the payment receipt code shown in FIG. 3, the two-dimensional code of which is used as the payee's identifier. The area in which the two-dimensional code is located can be called the first area; the check code can be used to check the security of the two-dimensional code, and the area in which the check code is located can be called the second area.

The first area and second area are not limited to having only the aforementioned two-dimensional code or check code. For example, taking a payment receipt code as an example, in addition to a check code, the second area may also comprise information such as the payee's profile picture and nickname, and in addition to a two-dimensional code, the first area may also have other contents superimposed on the two-dimensional code.

There can be many ways to combine the first area and second area. For example, one combination mode can have the second area surrounded by the first area, as illustrated in FIG. 3; or the second area can be set at the periphery of the first area, as illustrated in FIG. 4.

The code scanning device provided by one or more embodiments of this disclosure may comprise a memory, a processor, and computer readable instructions stored in the memory and executable by the processor, and achieving the following steps when the processor executes the instructions:

scanning a transaction code, the transaction code comprising: a two-dimensional code and a check code identifiable through human vision;

parsing the two-dimensional code to obtain a two-dimensional code content contained in the two-dimensional code;

obtaining the check code;

sending the two-dimensional code content and the check code to a server.

One or more embodiments of this disclosure also provide a transaction code verification device, which may comprise a memory, a processor, and computer readable instructions stored in the memory and executable by the processor, and achieving the following steps when the processor executes the instructions:

receiving a transaction code content of a transaction code sent by a client, the transaction code comprising: a two-dimensional code and a check code identifiable through human vision, the transaction code content comprising: a two-dimensional code content included in the two-dimensional code, and the check code;

using a mapping algorithm to obtain a corresponding mapped check code, based on the two-dimensional code content;

comparing the mapped check code to the check code in the transaction code content, and determining that the transaction code has been successfully verified if the mapped check code and the check code in the transaction code content match.

A person skilled in the art shall understand that one or more embodiments of this disclosure may provide a method, system, or computer program product. Therefore, one or more embodiments of this disclosure may employ a purely hardware embodiment form, a purely software embodiment form, or an embodiment form that combines software and hardware. Also, one or more embodiments of this disclosure may employ the form of a computer program product achieved through computer storage media (including but not limited to magnetic disc memory, CD-ROM, optical memory, etc.) comprising computer-executable program code in one or more of these.

These computer program instructions can also be stored in computer-readable memory that can cause a computer or other programmable data processing device to operate in a given mode, causing the instructions stored in this computer-readable memory to generate a product comprising an instruction apparatus. This instruction apparatus achieves the functions specified in one or more flows of a flow chart and/or one more blocks of a block diagram.

These computer program instructions can also be loaded onto a computer or other programmable data processing device, enabling the execution of a series of operation steps on the computer or other programmable device to produce computer processing. In this way, the instructions executed on the computer or other programmable device provide steps for achieving the specified functions of one or more flows in a flow chart and/or one or more blocks in a block diagram.

It should also be noted that the terms "contain" and "comprise" and any variations thereof are non-exclusive. Thus, a process, method, commodity, or device comprising a series of elements does not comprise those elements only; it can also comprise other elements not explicitly listed, or elements inherent to that process, method, commodity, or device. When there are no other limitations, an element defined by the phrasing "comprising one . . . " does not exclude the presence of other, similar elements in the process, method, commodity, or device comprising the element.

One or more embodiments of this disclosure can be described in the general context of computer-executable instructions executed by a computer such as a program module. Generally speaking, program modules comprise routines, programs, objects, components, and data structures, etc. for executing specific tasks or achieving specific data abstraction. They can also implement one or more embodiments of this disclosure in a distributed computing environment. In a distributed computing environment, connections are made to remote processing devices through a communications network for the execution of tasks. In a distributed computing environment, a program module can be located locally, including storage devices, and in remote computer storage media.

The separate embodiments in this disclosure are described progressively, and it is sufficient for the embodiments to reference each other regarding their similar parts. The description of each embodiment focuses on the ways in which it differs from other embodiments. In particular, the descriptions of server device embodiments are relatively simple because they are basically identical to the method embodiments, and description of correlated features by reference to the method embodiments is sufficient.

The preceding is a description of specific embodiments of this disclosure. Other embodiments fall within the scope of the attached Claims. Under certain conditions, it is possible to achieve the desired results by executing the actions or steps in the claims in a sequence different from that of the embodiments. In addition, the processes illustrated in the accompanying drawings do not require that the specific sequences or consecutive orders shown be followed in order to achieve the desired results. In certain implementation manners, multitasking and parallel processing are possible or may be preferable.

The preceding are merely the preferred embodiments of one or more embodiments of this disclosure. They do not limit this disclosure. All modifications, equivalent substitutions, and improvements made within the spirit and principles of this disclosure shall fall within the scope of protection of this disclosure.

The invention claimed is:

1. A method, comprising:
    receiving a request from a client to generate a transaction code;
    in response to receiving the request:
       generating a two-dimensional code;
       obtaining a check code based at least on the two-dimensional code by applying a mapping algorithm to the two-dimensional code; and
       combining the two-dimensional code and the check code to form the transaction code; and
    sending the transaction code to the client.

2. The method of claim 1, where applying the mapping algorithm to the two-dimensional code comprises:
    combining a salt with the two-dimensional code; and
    applying a hash function to the combined salt and two-dimensional code to generate the check code.

3. The method of claim 1, wherein the transaction code comprises a first area and a second area, the first area comprising the two-dimensional code, and the second area comprising the check code.

4. The method of claim 3, wherein:
    the second area is surrounded by the first area; or
    the second area is located at a periphery of the first area.

5. The method of claim 1, wherein the transaction code is a payment receipt code, wherein the client is a payment software client associated with a payee.

6. The method of claim 5, wherein two-dimensional code comprises a unique identifier of the payee.

7. The method of claim 5, wherein the payment receipt code is configured to be scanned by a second client associated with a payer making payment to the payee, the method further comprising: receiving, from the second client, a payment request comprising the two-dimensional code and the check code.

8. The method of claim 7, further comprising: verifying the payment request, wherein verifying the payment request comprises:
    applying the mapping algorithm to the two-dimensional code received from the second client to generate a mapped check code; and
    comparing the mapped check code to the check code of the received payment request to determine if there is a match.

9. The method of claim 8, wherein if the mapped check code and the check code of the received payment request match, the method further comprising:
    obtaining an account of the payee based on the two-dimensional code; and
    executing a payment front an account of the payer to the account of the payee.

10. A non-transitory computer-readable storage medium storing instructions that, when executed by a processor, cause the processor to perform a method comprising:
    receiving a request from a client to generate a transaction code;
    in response to receiving the request:
       generating a two-dimensional code;
       obtaining a check code based at least on the two-dimensional code by applying a mapping algorithm to the two-dimensional code; and
       combining the two-dimensional code and the check code to form the transaction code; and
    sending the transaction code to the client.

11. The non-transitory computer-readable storage medium of claim 10, where applying the mapping algorithm to the two-dimensional code comprises:
    combining a salt with the two-dimensional code; and
    applying a hash function to the combined salt and two-dimensional code to generate the check code.

12. The non-transitory computer-readable storage medium of claim 10, wherein the transaction code comprises a first area and a second area, the first area comprising the two-dimensional code, and the second area comprising the check code, wherein:
    the second area is surrounded by the first area; or
    the second area is located at a periphery of the first area.

13. The non-transitory computer-readable storage medium of claim 10, wherein the transaction code is a payment receipt code, wherein the client is a payment software client associated with a payee.

14. The non-transitory computer-readable storage medium of claim 13, wherein the two-dimensional code comprises a unique identifier of the payee.

15. A non-transitory computer-readable storage medium storing instructions that, when executed by a processor, cause the processor to perform a method comprising:
    scanning a payment receipt code, the payment receipt code comprising: a two-dimensional code and a check code, wherein the check code is obtainable from the two-dimensional code by applying a mapping algorithm using the two-dimensional code; and
    sending a payment request to a server, the payment request comprising the two-dimensional code and the check code, wherein the server is configured to permit execution of the payment request in response to determining that the check code of the payment request is the same as a mapped check code obtained from applying the mapping algorithm using the two-dimensional code.

16. The non-transitory computer-readable storage medium of claim 15, wherein applying the mapping algorithm using the two-dimensional code comprises:
    combining a salt with the two-dimensional code; and
    applying a hash function to the combined salt and two-dimensional code to obtain the mapped check code.

17. The non-transitory computer-readable storage medium of claim 15, the method further comprising: prior to sending the payment request, obtaining the two-dimensional code and the check code from the payment receipt code.

18. The non-transitory computer-readable storage medium of claim 15, wherein:
    the transaction code comprises a first area and a second area, the first area comprising the two-dimensional code, and the second area comprising the check code.

19. The non-transitory computer-readable storage medium of claim 18, wherein:
    the second area is surrounded by the first area; or
    the second area is located at a periphery of the first area.

20. A non-transitory computer-readable storage medium storing instructions that, when executed by a processor, cause the processor to perform a method comprising:

receiving a payment request from a client, the payment request comprising a two-dimensional code and a check code contained in a payment receipt code;

applying a mapping algorithm to the two-dimensional code to generate a mapped check code;

comparing the mapped check code to the check code of the payment request to determine if they match;

if the mapped check code and the check code of the payment request match, permitting execution of the payment request; and if the mapped check code and the check code of the payment request do not match, denying execution of the payment request.

\* \* \* \* \*

UNITED STATES PATENT AND TRADEMARK OFFICE
CERTIFICATE OF CORRECTION

PATENT NO. : 10,755,064 B2
APPLICATION NO. : 16/716838
DATED : August 25, 2020
INVENTOR(S) : Jian Ren It is certified that error appears in the above-identified patent and that said Letters Patent is hereby corrected as shown below:

In the Claims

Claim 6, Column 17, Line 39:
"wherein two-dimensional code" should read -- wherein the two-dimensional code --.

Claim 9, Column 17, Line 61:
"executing a payment front an account of the payer" should read -- executing a payment from an account of the payer --.

Signed and Sealed this
Twenty-sixth Day of September, 2023

Katherine Kelly Vidal
*Director of the United States Patent and Trademark Office*